Patented Dec. 8, 1936

2,063,245

UNITED STATES PATENT OFFICE 2,063,245

MEANS AND PROCESS FOR DETECTION OF DETERIORATION OF FOOD

Kurt W. Haeseler, Forest Hills, N. Y., assignor to Foster D. Snell, Inc., Brooklyn, N. Y., a corporation of New York No Drawing. Application February 1, 1934, Serial No. 709,391

23 Claims. (Cl. 99—171)

This invention relates to the art of preserving articles of food including beverages, beverage bases, condiments and other substances which require protection against the action of the air, or harmful gases perhaps contained in the air, or to be preserved against fermentation or putrefaction, and to this end are maintained in hermetically closed containers. These containers may be evacuated, or may be filled with inert gases, or may be sealed without other gases than those remaining in the containers after their filling with the material to be preserved.

The containers may be of opaque or transparent or translucent materials.

One object of this invention is the provision of a device which may be placed in these containers at the time they are closed, which will indicate whether any change in the condition of the enclosed material has occurred since the closing.

Another object of the invention is a method by which the presence of undesirable or harmful gases in the container may be detected.

Another object of the invention is to produce a device to be placed in such containers at the time of their closing which shall indicate, by a change in its appearance, or by a chemical change, that such undesirable or harmful gas has entered the container, or has been produced by deterioration or fermentation of the material therein.

When fermentable or putrescible materials are placed in hermetically closed containers, it is necessary to sterilize them in order to destroy the germs contained in them, or acquired from the atmosphere.

It sometimes happens that this sterilization is incomplete, and fermentation or putrefaction occurs in consequence.

Also, it sometimes occurs that the closure of the container is imperfect, or that it gives way to such a degree that air is admitted, and produces changes in the material, or carries bacteria with it, and that these produce fermentative changes, either of which render the material unfit for use, or at least cause deterioration therein.

Accordingly, another object of this invention is to provide a process and means by which the presence of such air, such deterioration or such fermentation may be detected, either upon opening the container, if it is opaque, or upon inspection through the walls thereof, if it is transparent.

Another object of this invention is to provide an article of manufacture which comprises a container filled with material which needs protection from air or oxygen, and contains a device by which the presence of this air may be detected.

The process comprises the placing within the container, at the time of closing the same, of an article of manufacture impregnated or coated with a substance which will be affected by any change in composition of the gas or in the container which may be produced by fermentation or other change of the material in the container, or which will be affected by the oxygen of the air which may have gained access to that material, or which will indicate the presence of undesirable or harmful gases which may have entered the container because of defective closing, or of injuries to the container.

Whichever of these is the purpose for which the test material is placed in the container, it may also carry printed matter, directed to the one who opens the container, either in the nature of directions for the use of the material in the container, a coupon or other advertising matter, or a request for the return of the container and contents if the condition of the test material indicates that any deterioration has occurred.

Under the term "beverage bases", I include natural products such as coffee or tea, preparations in dry or comminuted form and adapted to be made into a beverage by the addition of a suitable liquid, and materials obtained by concentrating or drying beverages, such as milk, or beer, both of which beverages are known in both dry and concentrated liquid form.

Many other substances, such as coffee extract, modified coffee, malted milk, cocoa, and bouillon cubes, are named merely as ilustrations of the materials which may be classed as beverage bases, but these are not named in a limiting sense, but merely as illustrations.

One application of my invention may be to the vacuum packing of coffee which I will now describe in the illustrative sense.

The coffee bean is of a cellular structure, and within these cells the oils and volatile flavoring substances which give to coffee a large part of its value as a beverage are contained.

These substances are volatile, and very easily affected by the oxygen of the air, so that, very soon after the beans are roasted and ground, deterioration of flavor and taste begins, due to this oxygenation, and progresses very rapidly, with concomitant deterioration of commercial value.

To avoid this, the vacuum packing of coffee has been used and the process is so well known as not to require detailed description. It is sufficient to say that the freshly roasted coffee is ground, and packed in cans from which the air is immediately exhausted and the cans hermetically sealed.

It sometimes happens that the sealing is imperfect, not withstanding the utmost care is used, or that it partially gives way during the handling of the cans and air is thereby admitted.

While the consequent oxidation of the oils cannot be recognized visually, nor even surely by the odor or taste by unskilled persons, the quality of the coffee is damaged.

My process provides a way by which this admission of air may be detected, and the amount of air present estimated.

This comprises the placing in the can, at the time it is sealed, of absorbent material such as a strip of fabric or paper or fibrous material which has been impregnated with a substance or mixture of substances, inert to the absorbent material, but whose appearance, preferably its color, will be altered in the presence of the oxygen, and whose change in appearance, may, if desired, be so calibrated as to show the amount of oxygen present.

If this absorbent material be impregnated with a mixture of ferrous sulfate, tannic acid and pyrogallic acid, and exposed to air, the ferrous sulfate will change to ferric sulfate, and this will unite with the acids to form dark colored ferric salts thereby changing the color of the detector to a darker shade.

As this change occurs very quickly, the color of a strip of such detector will change so quickly upon opening a can containing it as to make it impossible to determine whether the change occurred by virtue of air which had gained access to the can, or by the air with which it came into contact when the can was opened.

Machines used in the vacuum packing of coffee are now so accurate, as to leave but a very small fraction of one per cent of air in the container, an amount which is negligible. But, even so, it is conceivable that this small amount of air might affect the detector and alter its color without in any way affecting the quality of the coffee, owing to its absorption by the detector.

It is also possible that so small an amount of air might gain entrance to the can that it could not affect the coffee, but be entirely absorbed by the detector and produce a color change therein, while a larger amount might produce the identical color change and also affect the coffee, not being entirely absorbed by the detector.

It is therefore necessary to add a substance to the detector which will act as a retarder, that is, which will slow up the change of color after the opening of the can for a sufficient time to enable it to be determined whether the change had occurred before the opening of the container.

As such retarder, I use acids or acid reacting substances, and prefer to use hydrochloric acid, because of the ease with which the amount can be determined and apportioned. It is to be noted, however, that this retarder may also be a reducing agent as well.

I accordingly add enough of this retarder, whatever it may be, to delay the change of color for a short time after the opening of the can, so that it may be seen whether the color change had already occurred before the opening. It is necessary to so adjust the amount of retarder that exposure to a limited amount of adventitious air in the closed can, acting for a long time, will produce a change in the color of the detector, while a larger amount, as in the atmosphere, acting for a short time, will not be able to do so.

Another composition I have used as a detector, is a mixture of ferrous sulfate and a thiocyanate, but, as almost all samples of ferrous sulfate also contain traces of ferric salts, it is necessary to add to the solution of this mixture, a reducing agent which shall change the ferric salt present to the ferrous form and an additional amount which will act as a retarder. The reducing agent I prefer to use is stannous chlorid, and I add it in such amount that it will retard the appearance of the pink or blood-red color of ferric thiocyanate until a careful inspection of the detector may disclose whether the detector had been colored before the can had been opened, the amount of the detector retarder being adjusted upon the same principles as explained above for the retarder with the before described retarder.

The material used to carry the detector mixture may be any absorbent material which is inert to the mixture, such as an absorbent fabric, filter paper, or absorbent cotton, but I prefer to use pure white filter paper, since it is easily procurable in sufficient purity and amount for this purpose.

In order that the material upon the absorbent shall not become too dry, it is necessary to add to it, in many cases, a small amount of a hygroscopic substance, and of the numerous substances of this character, I have used with satisfaction, glycerine, but any other hygroscopic substance may be used if it is inert to the other ingredients of the detector.

Other reducing substances than stannous chlorid may be used, provided they are inert to others of the detector substances.

A typical mixture I have devised and used for the detection of oxygen in closed containers is the following:—

| | | |
|---|---|---|
| Ferrous sulfate | grams | 3 |
| Potassium thiocyanate | do | 15 |
| Hydrochloric acid (5 normal) | c. c. | 10 |
| Glycerin | grams | 20 |
| Stannous chlorid solution | c. c. | 4 |
| Water | c. c. | 200 |

The stannous chloride solution is of such strength as to contain by analysis, 18 grams of tin per liter, and about fifty per cent, by volume, of hydrochloric acid.

Strips of absorbent material such as filter paper were dipped into the above solution and dried in an atmosphere of carbon dioxide, but the drying may take place in any gas inert to the mixture, as hydrogen or nitrogen, or in a vacuum. Papers so treated show a definite pink coloration in the air after thirty minutes exposure.

The same results were obtained by the substitution of ten cubic centimeters of sodium thiosulfate solution, deci-normal, for the stannous chloride solution.

Either of these solutions may be calibrated to determine with approximate accuracy, the amount of oxygen which has gained access to the can in which it is found to indicate its presence.

As stated above, imperfect sterilization of the product enclosed in hermetically sealed containers, or of the containers which contain the product after the sealing, will result in fermentation of that product, and this fermentation may be either alkaline or acid. Entrance of air into the container after its sterilization, is very liable to carry into it also bacteria of various kinds, and these develop and cause fermentation of both or either kind.

Therefore another application of my invention is to the detection of fermentation in hermetically sealed containers.

I have accordingly devised means analogous to those disclosed above for the detection of the products of these fermentations. That is, I have devised solutions of mixtures of substances which will react with these fermentation products, and these solutions are absorbed, or coated upon, absorptive substances as detailed above for the oxygen detecting solutions, and placed within containers containing fermentable materials.

The particular substance or mixture to be used in any given case, is determined by the nature of the products of fermentation. If the product is an alkali, for instance, the substance will be a detector of alkali, and if an acid, a substance which will react with that acid.

As an example of the detection of a fermentation which yields carbon dioxide as a product, I use absorbent materials impregnated with the following solution:—

|  | c. c. |
|---|---|
| Saturated solution lime water | 10 |
| Phenol phthalein solution | 0.5 |
| Glycerine | 0.5 |

The phenol phthalein solution is made by dissolving 1 gram of phenol phthalein in 100 c. c. of fifty per cent alcohol.

In place of the glycerin, any other hygroscopic material which is inert to the carbon dioxide and substances of the mixture may be used.

A strip of filter paper or other absorbent substance is impregnated with this solution and dried in air which is free from carbon dioxide, or in any inert gas, and placed in the container before it is sealed.

This detector is pink in color, and is turned white by carbon dioxide or other acid. Consequently, if, upon opening a container, the detector is found to have become white, it is obvious that fermentation has occurred, and the material deteriorated.

Since this detector is not sensitive to carbon dioxide found in air in the usual amount, the use of a retarder is unnecessary.

As an example of a detector which will indicate a fermation with alkaline products, for instance ammonia, I have used the following:—

50 grams potassium iodide dissolved in a minimum amount of water (about 35 c. c.)
Saturated solution of mercuric chloride is added until a slight precipitate settles out
400 c. c. of 50% potassium hydroxide solution are added and the whole diluted to a volume of 1000 c. c.

The resulting solution is allowed to settle and the clear liquid decanted.

An absorbent material is impregnated therewith, and dried in an acid and ammonia-free air, and placed in a container along with a fermentable substance which yields ammonia as a product of its fermentation.

Since the atmosphere usually or frequently contains a large enough amount of ammonia to cause a change of color, from light yellow to brown, in this reagent, it is necessary to incorporate with it a retarder which shall retard the change of color long enough to enable the one who opens a container in which it has been placed to determine whether the detector had changed color before the said opening.

As a retarder, I have found that potassium iodide may be used. An increase in the amount of potassium iodide above that named above, will markedly retard the color change in the presence of ammonia, and an increase of the amount of mercuric chloride will accelerate it.

The rate of change of color of the above detector is a function of the ratio of potassium iodide and mercuric chloride therein, and the exact mixture will be determined by the specific rate of color formation desired.

If it be found that the above mixture is too alkaline to be absorbed upon vegetable absorbents, mineral substances, such as asbestos fibers, pumice, or Silocel, may be used.

It is also necessary to add a hygroscopic substance, and glycerine may be used.

A study of the above detectors shows that each can absorb a definite amount of the substance to be detected without showing a change of color, but that such color change follows the absorption of a larger amount.

Thus, the detector of oxygen disclosed herein, contains oxidizable material which yields colored compound in the presence of oxygen, and a reducing agent which delays such oxidation until it has absorbed a definite amount of oxygen, this depending upon the amount of reducing agent, from the container in which it is confined.

So in the detector of carbon dioxide, the calcium hydroxide solution becomes colorless only after the whole of the hydroxide has been united chemically with the carbon dioxide.

Also in the detector of ammonia, the color change does not occur until di-mercuro-ammonium-iodide is formed in excess of the amount soluble in the potassium iodide present.

The term "retarded detector", then, as used herein, designates a composition of matter, which, when exposed to the product to be detected, indicates its presence by a change of color, either the appearance of color or its disappearance, only after a certain portion of this product has produced subsidiary chemical changes yielding colorless products until its capacity for producing such products has been exhausted. Also, this absorption of a portion of the material to be detected may be by a portion of the composition which yields the color change, or by a substance added for that purpose.

As a corollary of the above, it is seen that these retarded detectors have another function.

In the packaging of coffee, for instance, either by the vacuum process or when the container is filled with an indifferent gas, it is impossible to remove, economically, all the air, and the amount remaining will react with substances in the coffee to impair its taste and flavor. A retarded detector of oxygen, as above described, absorbs this residual air without producing any color change, and thus aids in preserving the coffee.

Since certain changes in carrying out the above processes, and certain modifications in the articles which embody the invention may be made without departing from its scope, it is intended that all matter contained in the above description shall be interpreted as illustrative and not in a limiting sense.

I claim:

1. As an article of manufacture, an hermetically closed evacuated container, containing a product which must be protected from exposure to oxygen and a retarded detector of the presence of oxygen therein by the chemical action of the oxygen thereon.

2. As an article of manufacture, an hermetically closed container which contains a product that must be protected from exposure to oxygen and a retarded detector of oxygen, and which is filled with an inert gas.

3. As an article of manufacture, an hermetically closed evacuated container which contains a beverage base and a retarded detector of the presence of oxygen therein.

4. As an article of manufacture, an hermetically closed container which contains roasted and ground coffee and a retarded detector of oxygen.

5. As an article of manufacture, an hermetically closed container which contains roasted and ground coffee, a retarded detector of oxygen, and is filled with an inert gas.

6. A method of detecting whether air has gained access to a beverage base in an hermetically closed container which comprises disposing a retarded detector of oxygen in the container, exhausting and closing the container, whereby the presence of air therein will be shown by a chemical change produced in said detector by the action of oxygen thereon.

7. The process of detecting whether air has gained access to coffee contained in a hermetically closed container, which comprises disposing a retarded detector of oxygen in said container, exhausting and closing the container, whereby the presence of air therein will be shown by a chemical change produced in said detector by the action of oxygen thereon.

8. The step in the process of detecting leakage of air into an hermetically closed receptacle containing food which comprises disposing an absorbent material carrying a substance which is affectable by the presence of oxygen and a substance which retards the effect of the oxygen on the first named substance in such container, before it is hermetically closed.

9. A detector of the presence of fermentation that yields an ammoniacal product, which comprises an absorbent material carrying the reaction products resulting from the mixture of solutions of mercuric chloride, potassium iodide, and potassium hydroxide, the ratio of potassium iodide to mercuric chloride in such mixture of solutions being such as to give a suitable degree of retardation to the change produced by the action of the ammoniacal product of fermentation upon the products carried by the absorbent material.

10. A detector of the presence of oxygen, which comprises an absorbent body carrying a salt of a metal having more than one valence, and in its state of lower valence, and which assumes a higher valence by the action of oxygen, a substance which possesses the property of reacting with the salt of the metal to form a colored compound in which the said metal has a higher valence, and a third substance which acts as a retarder to the formation of the said colored compound.

11. A detector of oxygen which comprises an absorbent body carrying the reaction products of a mixture of solutions of ferrous sulfate, a thiocyanate of an alkali metal, stannous chloride hydrochloric acid.

12. As an article of manufacture, a hermetically closed receptacle containing a deterioratable food substance from which an ammoniacal product will be evolved during its deterioration, and a detector of ammonia which comprises absorbent material carrying the reaction products resulting from the mixture of solutions of mercuric chloride, potassium iodide and potassium hydroxide, the ratio of potassium iodide to mercuric chloride in said mixture of solutions being such as to give a suitable degree of retardation to the change produced by the action of the ammoniacal product upon the products carried by the absorbent material.

13. As an article of manufacture, a hermetically closed receptacle containing a food substance which will deterioriate in the presence of oxygen, and a detector of oxygen which comprises an absorbent body carrying a salt of a metal having more than one valence, and in its state of lower valence and which assumes a higher valence by the action of oxygen, a substance which possesses the property of reacting with the salt of the metal to form a colored compound with the metal when it assumes a higher valence and a third substance which acts as a retarder to the formation of the said colored compound.

14. As an article of manufacture, a hermetically closed receptacle containing a food substance which will deteriorate in the presence of oxygen and a detector of oxygen which comprises an absorbent body carrying the reaction products of a mixture of solutions of ferrous sulfate, a thiocyanate of an alkali metal, stannous chloride and hydrochloric acid.

15. The method of detecting oxygen in a hermetically closed receptacle which contains food material that will deteriorate in the presence of oxygen, which comprises placing a retarded chemical detector of oxygen in the receptacle exhausting and closing the receptacle whereby the presence of oxygen will be demonstrated by a chemical change in the detector which will be produced by the chemical action of the oxygen.

16. The method of detecting deterioration of food material contained in a hermetically closed container which comprises placing a retarded detector of the product of the deterioration in the container before the closing thereof, exhausting and closing the container whereby any deterioration of the food material will be shown by a chemical change produced in the detector by the product of such deterioration.

17. As an article of manufacture, an hermetically closed evacuated container which contains roasted and ground coffee and a calibrated and retarded chemically reactive detector of oxygen.

18. The method of detecting fermentation of a fermentable food material contained in a hermetically closed container, which comprises placing a retarded chemical detector of a product of the fermentation of that material in the container before it is closed, whereby the presence of fermentation is shown by a change produced upon the detector by the chemical action of the said product thereon.

19. The method of detecting oxygen in a hermetically closed container which contains food material which comprises placing a retarded detector of oxygen in the container before it is closed, whereby the presence of oxygen therein is shown by a chemical change produced upon the detector by the chemical effect of the oxygen thereon.

20. The method of detecting alteration of food material contained in a hermetically closed container which comprises placing a calibrated and retarded chemical detector of a product of such alteration in said container before closing it, whereby the presence of alteration is shown by a change produced by the chemical action of said product upon said detector.

21. As an article of manufacture, an hermetically closed, evacuated container which contains a food product and a retarded chemical detector of a product of fermentation of such food product.

22. As an article of manufacture, an hermetically closed container which contains a fermentable food product, a retarded chemical detector of a product of fermentation of said food and an inert gas.

23. As an article of manufacture, an hermetically closed container, which contains a deteriorable food substance, a retarded chemical detector of a product of its deterioration, and an inert gas.

KURT W. HAESELER.